United States Patent
Amari et al.

(10) Patent No.: US 12,350,875 B2
(45) Date of Patent: Jul. 8, 2025

(54) PREFORM LAYERED BODY AND LAYERED CONTAINER

(71) Applicant: NISSHA CO., LTD., Kyoto (JP)

(72) Inventors: Fumiya Amari, Nagano (JP); Tadanobu Atobe, Nagano (JP); Chuzo Taniguchi, Kyoto (JP); Satoshi Wada, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 431 days.

(21) Appl. No.: 18/014,170

(22) PCT Filed: Dec. 2, 2021

(86) PCT No.: PCT/JP2021/044227
§ 371 (c)(1),
(2) Date: Jan. 2, 2023

(87) PCT Pub. No.: WO2022/163118
PCT Pub. Date: Aug. 4, 2022

(65) Prior Publication Data
US 2023/0278274 A1  Sep. 7, 2023

(30) Foreign Application Priority Data
Jan. 26, 2021 (JP) .................. 2021-010311

(51) Int. Cl.
*B29C 49/22* (2006.01)
*B29C 49/08* (2006.01)
(Continued)

(52) U.S. Cl.
CPC .............. *B29C 49/22* (2013.01); *B29C 49/08* (2013.01); *B29C 49/20* (2013.01); *B65D 1/40* (2013.01);
(Continued)

(58) Field of Classification Search
CPC ......... B29C 49/22; B29C 49/08; B29C 49/20; B29C 2049/2071; B29C 49/12;
(Continued)

(56) References Cited

U.S. PATENT DOCUMENTS

| | | |
|---|---|---|
| 6,649,121 B1 | 11/2003 | Hamamoto et al. |
| 2001/0021356 A1 | 9/2001 | Konrad |
| 2008/0265461 A1* | 10/2008 | Freund .............. G06K 19/07758 |
| | | 264/272.15 |

FOREIGN PATENT DOCUMENTS

JP   2019042995   3/2019

OTHER PUBLICATIONS

"International Search Report (Form PCT/ISA/210) of PCT/JP2021/044227", mailed on Jan. 11, 2022, with English translation thereof, pp. 1-4.

* cited by examiner

Primary Examiner — James C Yager
(74) Attorney, Agent, or Firm — JCIPRNET

(57) ABSTRACT

The disclosure provides a preform layered body and a layered container produced by biaxial stretch-blow forming of the layered body. In this preform layered body, an RFID tag has been inserted between an inner-layer-use mouth part and an outer-layer-use mouth part that are to remain unaltered, with no biaxial stretch-blow forming performed thereon, as a container mouth part for a layered container. Since the container mouth part does not become exposed to the high temperature and high pressure for stretch-blow forming purposes, abuses to the RFID tag, such as damage, breakage, and deformation, which arise from the heating, pressurization, and stretching during the stretch-blow forming, can be avoided reliably. In addition, labor-saving and (Continued)

counterfeit prevention effect can be anticipated by causing the RFID tag to hold product information.

13 Claims, 7 Drawing Sheets

(51) Int. Cl.
*B29C 49/20* (2006.01)
*B65D 1/40* (2006.01)
*B29L 31/00* (2006.01)

(52) U.S. Cl.
CPC .............. *B29C 2049/2071* (2022.05); *B29L 2031/7158* (2013.01); *B65D 2203/00* (2013.01)

(58) Field of Classification Search
CPC .......... B29C 49/42802; B29C 49/4281; B29C 2049/2008; B29C 2949/0732; B29C 49/10; B29C 2049/023; B29C 2049/024; B29C 2949/0715; B29C 2949/0721; B29C 2949/0722; B29C 2949/078; B29C 2949/079; B29C 2949/08; B29C 2949/3008; B29C 2949/3012; B29C 2949/3016; B29C 2949/302; B29C 2949/3026; B29C 2949/3034; B29C 2949/3074; B29C 2949/3094; B29C 49/071; B29L 2009/001; B29L 2031/34; B29L 2031/3481; B29L 2031/3493; B29L 2031/7158; B65D 1/40; B65D 2203/00; B65D 1/0215; B65D 2203/02; B65D 2203/10; B65D 2203/12
See application file for complete search history.

PREFORM LAYERED BODY AND LAYERED CONTAINER

CROSS-REFERENCE TO RELATED APPLICATION

This application is a 371 application of the International PCT application serial no. PCT/JP2021/044227, filed on Dec. 2, 2021, which claims the priority benefits of Japan Patent Application No. 2021-010311, filed on Jan. 26, 2021. The entirety of each of the above-mentioned patent applications is hereby incorporated by reference herein and made a part of this specification.

TECHNICAL FIELD

The disclosure relates to a layered container manufactured by simultaneously biaxially stretch-blow forming large and small preforms while coaxially overlapping each other. More particularly, it relates to a preform layered body having a structure in which a tag is inserted between layers, and a layered container manufactured by biaxially stretch-blow forming the layered body.

RELATED ART

Layered containers are widely used as beverage bottles and the like. Patent Literature 1 proposes a layered container having a structure in which an intermediate layer such as a decorative label is inserted between layers in the body of the container. In this layered container, layered preforms are manufactured by inserting an intermediate layer such as a label between large and small preforms, and the layered preforms are heated and subjected to biaxial stretch-blow forming to manufacture the layered container having a structure in which a label or the like is inserted between the layers.

CITATION LIST

Patent Literature

[Patent Literature 1] Japanese Patent Application Laid-Open No. 2019-42995

SUMMARY

Technical Problem

The following problems arise when manufacturing a layered container by biaxially stretch-blow forming a preform layered body in which large and small preforms are coaxially overlapped with a label or the like sandwiched therebetween.

The preform layered body in which the tag is inserted is heated from the outside by a heater to a temperature suitable for biaxial stretch-blow forming. During the preform heating step, the tag inserted between the overlapped preforms is also exposed to heat. The tag may be damaged by heat, thermally deformed, and deteriorated. If a tag such as an IC tag in which an electronic circuit or wiring is mounted is to be inserted, there is a risk of damage or disconnection.

Further, during biaxial stretch-blow forming of the preform layered body, the tag is exposed to high pressure by blowing air and is biaxially stretched together with the preform. Since the tag cannot withstand high pressure and cannot follow the stretching of the preform, it may be damaged or broken.

If the tag is inserted so as not to be in close contact with the preform so as not to be stretched together with the preform, a problem arises in that the tag is likely to be displaced in the stretch-blow forming step. It is conceivable to form the tag from a sufficiently extensible resin material or the like, but it is difficult to reliably avoid damage and disconnection of mounted electronic components and wiring.

Furthermore, in the preform heating step, each part of the preform must be heated uniformly. The heat may be partially blocked or reflected by the inserted tag, and for example, the part of the preform located inside the tag may not receive the required amount of heat. If the heating state varies, problems such as inability to perform biaxial stretch blowing appropriately and crystallization of the resin occur.

In view of this, the disclosure provides a preform layered body suitable for producing a layered container in which a tag has been inserted in an appropriate state between layers, and provides a layered container produced by stretch-blow forming of the preform layered body.

Solution to Problem

In view of the above, the disclosure provides:
a preform layered body for forming a layered container made of plastic including a cylindrical container body, a container bottom closing a lower end of the container body, and a container mouth formed at an upper end of the container body by stretch-blow forming, the preform layered body including:
an inner-layer-use preform for forming an inner layer of the layered container;
an outer-layer-use preform for forming an outer layer of the layered container; and
a tag;
the inner-layer-use preform is disposed inside the outer-layer-use preform;
the inner-layer-use preform includes an inner-layer-use bottom and an inner-layer-use body subjected to stretch-blow forming to form a bottom inner layer part and a body inner layer part of the layered container, and an inner-layer-use mouth that remains as a mouth inner layer part of the layered container without being subjected to stretch-blow forming;
the outer-layer-use preform includes an outer-layer-use bottom and an outer-layer-use body subjected to stretch-blow forming to form a bottom outer layer part and a body outer layer part of the layered container, and an outer-layer-use mouth that remains as a mouth outer layer part of the layered container without being subjected to stretch-blow forming; and
the tag is disposed between the outer-layer-use mouth and the inner-layer-use mouth.

In the preform layered body according to the disclosure, the tag is inserted between the mouth inner layer part and the mouth outer layer part which remain as the mouth of the layered container without being subjected to stretch-blow forming. Since the mouth inner layer part and the mouth outer layer part of the preform layered body are not heated, pressurized, or stretched, it is possible to reliably avoid the occurrence of adverse effects such as breakage, breakage, and deformation of the tag. In addition, since the tag is protected by the inner and outer layers, it does not come into direct contact with the contents, and counterfeiting from the outside may be prevented.

In the disclosure, a housing gap may be formed between an outer peripheral surface of the inner-layer-use mouth of the inner-layer-use preform and an inner peripheral surface of the outer-layer-use mouth of the outer-layer-use preform, and the tag may be housed in the housing gap. It is possible to prevent the tag from interfering with and damaging the outer peripheral surface of the inner-layer-use mouth of the inner-layer-use preform or the inner peripheral surface of the outer-layer-use mouth of the outer-layer-use preform.

In the disclosure, an RFID tag or an IC tag may be used as the tag. Further, an LED tag including a flexible printed circuit board on which an LED is mounted may be used as the tag.

In the disclosure, an external communication port that communicates with the housing gap may be opened in an outer peripheral surface of the outer-layer-use mouth of the outer-layer-use preform. For example, when an LED tag including a flexible printed circuit board on which an LED is mounted is used as the tag, the external communication port may be used to pass wiring for supplying power from the outside to the LED.

Here, in the preform layered body used for manufacturing a layered container in which a cap is attached to the mouth of the container, a male threaded part and an annular support ring located between the male threaded part and the outer-layer-use body are formed on the outer peripheral surface of the outer-layer-use mouth of the outer-layer-use preform. In this case, the external communication port may be disposed at a position adjacent to the support ring on the male threaded part side so that the cap does not interfere with the wiring drawn out through the external communication port.

Further, when the inner-layer-use preform and the outer-layer-use preform are overlapped to form the preform layered body, a protrusion extending in a direction of a central axis of the inner-layer-use preform may be formed on an outer peripheral surface of the inner-layer-use bottom of the inner-layer-use preform so that the two preforms are positioned in a coaxial state, and a through hole may be formed in a center of the outer-layer-use bottom of the outer-layer-use preform to extend through the outer-layer-use bottom in a direction of a central axis of the outer-layer-use preform. By inserting the protrusion into the through hole, the inner-layer-use preform and the outer-layer-use preform that are overlapped are positioned coaxially.

Next, the disclosure relates to a layered container obtained by stretch-blow forming the preform layered body having the above configuration. A layered container of the disclosure is a stretched blow-formed product in which a tag is disposed between a container inner layer body and a container outer layer body that are layered, the layered container including:
- a cylindrical container body, a container bottom closing a lower end of the container body, and a container mouth formed at an upper end of the container body;
- the container inner layer body includes a bottom inner layer part and a body inner layer part subjected to stretch-blow forming to form inner layer parts of the container bottom and the container body, and a mouth inner layer part which forms an inner layer part of the container mouth without being subjected to biaxial stretch-blow forming;
- the container outer layer body includes a bottom outer layer part and a body outer layer part subjected to stretch-blow forming to form outer layer parts of the container bottom and the container body, and a mouth outer layer part which forms an outer layer part of the container mouth without being subjected to stretch-blow forming; and
- the tag is disposed between the mouth inner layer part and the mouth outer layer part.

In the layered container according to the disclosure, the tag is disposed between the mouth inner layer part and the mouth outer layer part which remain as the mouth without being subjected to stretch-blow forming. During the stretch-blow forming of the preform layered body, the mouth inner layer part and the mouth outer layer part are not exposed to high temperature and high pressure and are not stretch blown. It is possible to avoid adverse effects such as damage, breakage, and deformation of the tag due to heating, pressurization, and stretching for stretch blow forming. Thus, a layered container with a tag inserted in a suitable state is obtained.

Here, a housing gap may be formed between an outer peripheral surface of the mouth inner layer part and an inner peripheral surface of the mouth outer layer part, and the tag may be housed in the housing gap.

Further, an external communication port that communicates with the housing gap may be opened in the outer peripheral surface of the mouth outer layer part.

Further, a male threaded part and an annular support ring located between the male threaded part and the body outer layer part may be formed on the outer peripheral surface of the mouth outer layer part, and the external communication port may be opened at a position adjacent to the support ring on the male threaded part side.

In the disclosure, the tag includes electronic information carrying tags such as IC tags and RFID tags, wireless communication tags, LED tags including a flexible printed circuit board on which LEDs are mounted, various active elements and passive elements, tags including a flexible printed circuit board on which various circuits are mounted, for example, tags including a touch sensor, a pressure sensor, a temperature sensor, a liquid level sensor, an acceleration sensor, a gyro sensor, a vibration element, or the like. Further, the tag is not limited to the above, and may be, for example, a label printed with product information, a one-dimensional code, a two-dimensional code, or the like, or a decorative label.

DESCRIPTION OF THE EMBODIMENTS

First Embodiment

A layered container, a preform layered body, and manufacturing steps of a layered container according to a first embodiment of the disclosure will be described below with reference to FIGS. 1, 2 and 3.

(Layered Container)

Figure 1:
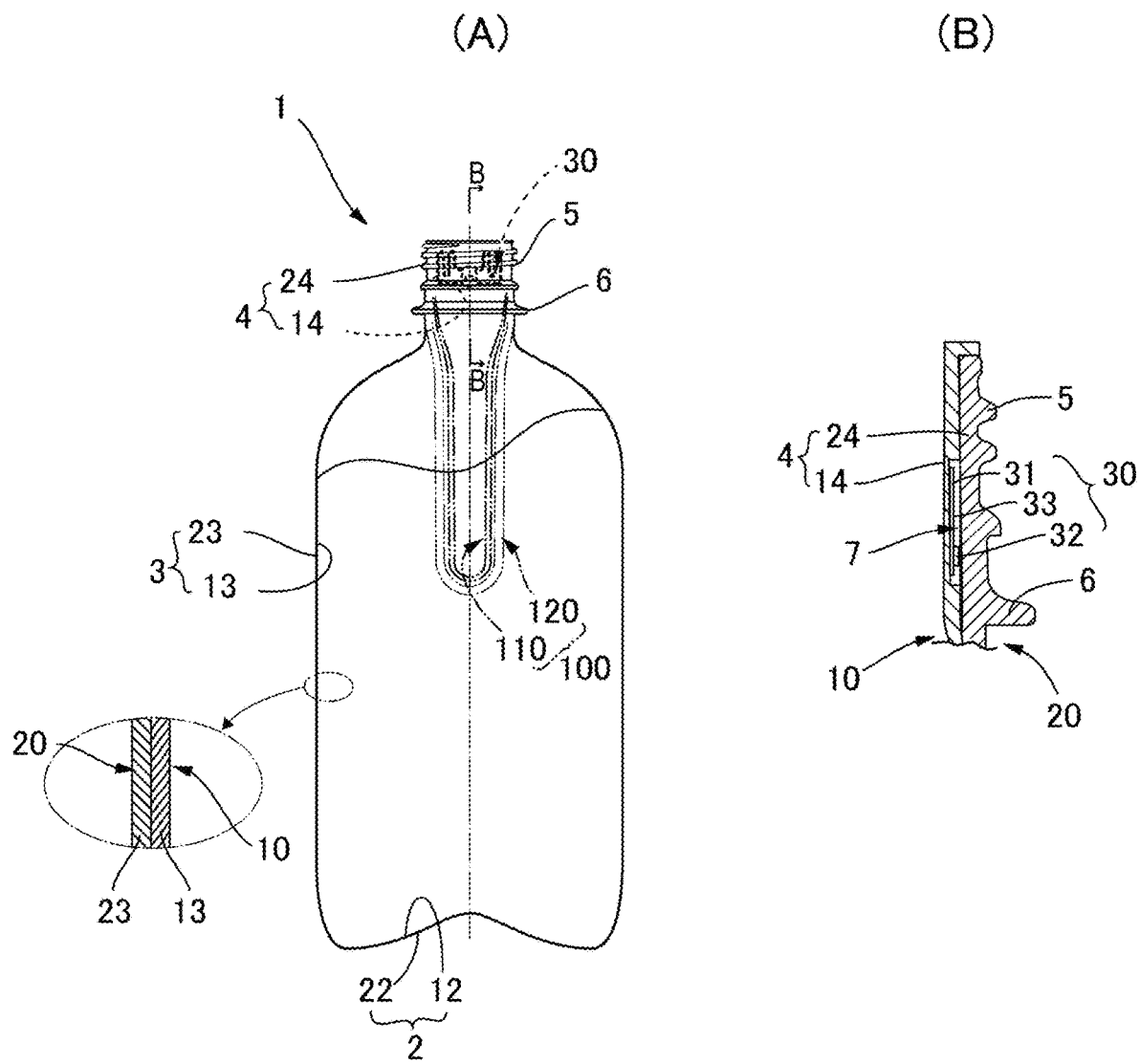
In FIG. 1, (A) is an illustration view showing a layered container according to a first embodiment of the disclosure, and (B) is a partially enlarged cross-sectional view of the mouth of the container.

(A) of FIG. 1 is an illustration view showing a layered container according to a first embodiment, and (B) is a partially enlarged cross-sectional view showing a part cut along the line B-B in (A) of FIG. 1. The layered container 1 is a biaxially stretched blow-formed product made of a thermoplastic resin, and includes a container bottom 2, a cylindrical container body 3, and a thin cylindrical container mouth 4 formed at the upper end of the container body 3. A male threaded part 5 for attaching a cap (not shown) is formed on the outer peripheral surface of the container mouth 4, and an annular support ring 6 is formed between the male threaded part 5 and the upper neck part of the container body 3.

The layered container 1 has a two-layer structure in which a container inner layer body is layered inside a container outer layer body 20 in close contact. Of course, a layered structure of three or more layers may also be used, in which case the inner layer of the two layers adjacent in the container inner-outer direction corresponds to the container inner layer body, and the outer layer corresponds to the container outer layer body.

The container inner layer body 10 includes a bottom inner layer part 12 and a body inner layer part 13 subjected to stretch-blow forming to form the inner layer parts of the container bottom 2 and the container body 3, and a mouth inner layer part 14 which forms the inner layer part of the container mouth 4 without being subjected to stretch-blow forming. Similarly, the container outer layer body 20 includes a bottom outer layer part 22 and a body outer layer part 23 subjected to stretch-blow forming to form the outer layer parts of the container bottom 2 and the container body 3, and a mouth outer layer part 24 which forms the outer layer part of the container mouth 4 without being subjected to stretch-blow forming. The male threaded part 5 and the support ring 6 are integrally formed on the outer peripheral surface of the mouth outer layer part 24.

In the layered container 1, a sheet-like RFID tag 30 having a rectangular outline is inserted between the mouth inner layer part 14 and the mouth outer layer part 24 that configure the container mouth 4. The RFID tag 30 includes a flexible printed circuit board 31, a memory chip 32, and an antenna pattern 33 formed of a conductive material such as copper foil, conductive paste, and the like.

A tag housing gap 7 is formed between the outer peripheral surface of the mouth inner layer part 14 and the inner peripheral surface of the mouth outer layer part 24. In this example, a rectangular recess having a depth and a size capable of housing the RFID tag 30 is formed in the outer peripheral surface of the mouth inner layer part 14 of the container outer layer body 20. The tag housing gap 7 is formed between the recess and the outer peripheral surface of the mouth outer layer part 24. The RFID tag 30 is housed in the tag housing gap 7. The recess may be formed in the inner peripheral surface of the mouth outer layer part 24 or may be formed in both the mouth inner layer part 14 and the mouth outer layer part 24.

The boundary between the container mouth 4, which is not subjected to stretch-blow forming, and the container body 3, which is subjected to stretch-blow forming, is not clearly defined. Stretch-blow forming is performed in a state in which the stretch ratio gradually increases from the part adjacent to the lower side of the support ring 6 of the container mouth 4 toward the container body 3. In this disclosure, the container mouth 4 that is not subjected to stretch-blow forming means the range from the top surface of the mouth to the lower surface of the support ring 6.

The layered container 1 having this configuration is provided in a state in which it is filled with a content such as a beverage or a liquid medicine and capped. The RFID tag 30 inserted in the container mouth 4 may carry various information such as information on contents and handling history. The carried information may be read and confirmed from the outside by wireless communication. Moreover, if the rewritable RFID tag 30 is used, the carried information may be updated and rewritten as needed. Security of the carried information is ensured by using a lock function for prohibiting rewriting of the carried information.

The RFID tag 30 is inserted into the container mouth 4 which is not subjected to stretch-blow forming. Unlike the case where the RFID tag 30 is inserted into the container body 3 and the container bottom 2, since it is not exposed to high heat, high pressure, and stretching for stretch-blow forming, damage, deformation, displacement, and the like due to these do not occur. Therefore, it is possible to obtain the layered container 1 in which the RFID tag 30 is properly inserted. Further, when an information carrying tag such as the RFID tag 30 is disposed on the outer peripheral surface of the container, there is a problem that mischief, tampering, and the like are likely to occur. In the layered container 1 of this embodiment, since the RFID tag 30 is inserted between the layers of the container mouth 4, it is difficult for mischief, tampering, and the like to occur. Furthermore, since the container mouth 4 has higher rigidity and strength than the container body 3 and the container bottom 2 and is less likely to deform, there is almost no possibility that the container mouth 4 will be greatly deformed and the RFID tag 30 will be damaged. In addition, the container mouth 4 is covered with a cap to protect and reinforce it, so the safety of the RFID tag inserted into the container mouth 4 is ensured.

Recently, in the face of unprecedented crises such as infectious diseases on a global scale, there is a serious labor shortage in the medical market. In addition, the number of young workers is decreasing due to the declining birthrate and aging population. Automation and efficiency of operations, in other words, "digitalization" have become urgent issues. The layered container 1 may be used as a container corresponding to these issues.

In addition, due to the recent problem of plastic waste, labeling of packaging containers has also become an issue. By having the RFID tag 30 carry information, it is possible to promote the elimination of labels, thereby contributing to the reduction of the amount of plastic used and the reduction of carbon dioxide.

Furthermore, a shift from one-way containers to a recycling system that uses reusable containers is being considered. It is also possible to have the RFID tag 30 carry the history of the packaging container.

In addition, counterfeits of Japanese brands are rampant overseas. Examples include printer ink, cosmetics, and alcohol. By inserting the RFID tag 30 into these packaging containers to carry predetermined information, it is expected to be effective in preventing counterfeits.

The layered container 1 having the above configuration is obtained by biaxially stretch-blow forming a preform layered body 100 having a configuration in which an outer-layer-use preform 120 and an inner-layer-use preform 110 of different sizes shown by imaginary lines in (A) of FIG. tare overlapped. The preform layered body 100 suitable for use in biaxially stretch-blow forming the layered container 1 is described below.

(Preform Layered Body)

Figure 2:
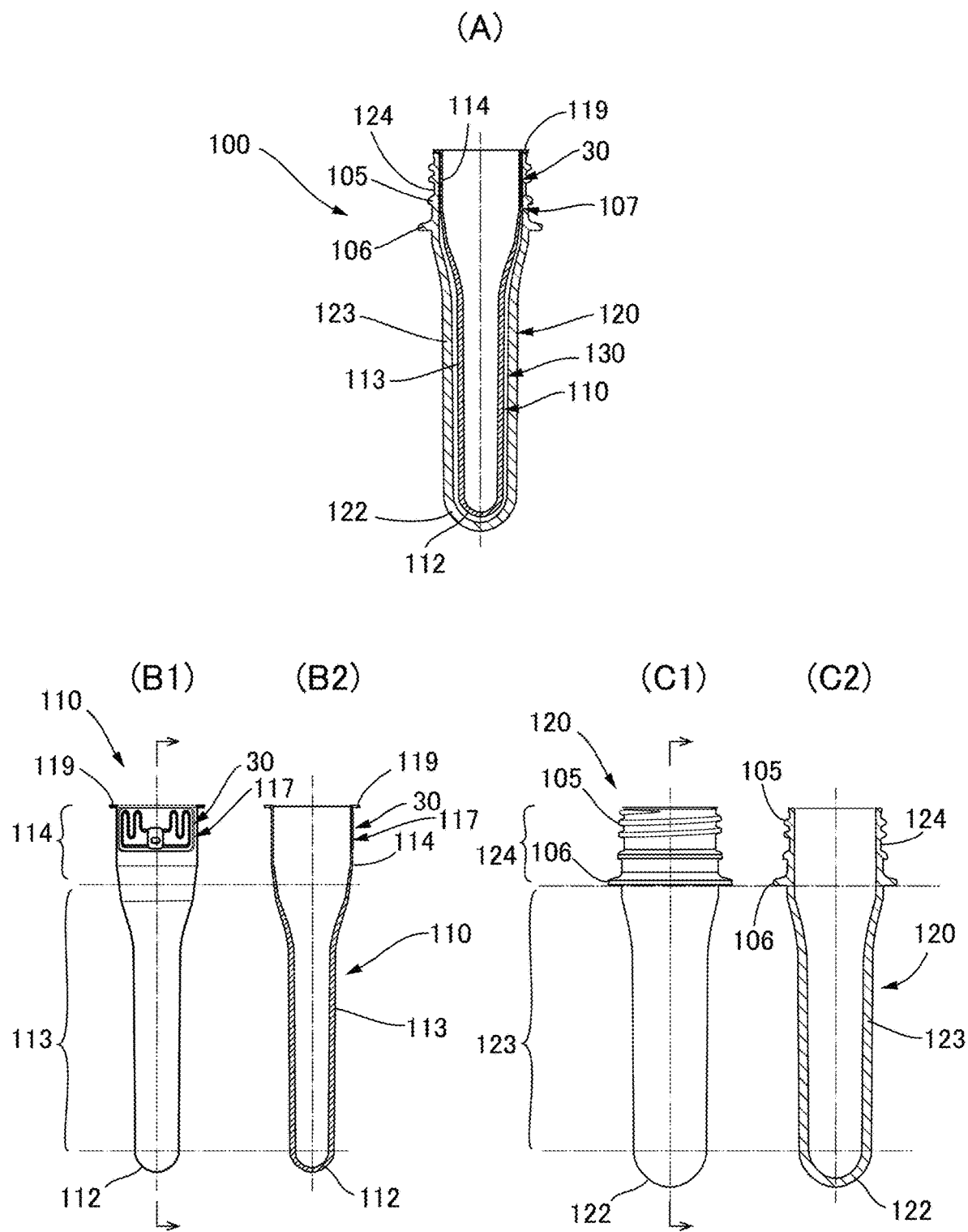
In FIG. 2, (A) is a longitudinal sectional view showing a preform layered body; (B1) and (B2) are a side view and a longitudinal sectional view showing an inner-layer-use preform of the preform layered body; and (C1) and (C2) are a side view and a longitudinal sectional view showing an outer-layer-use preform of the preform layered body.

(A) of FIG. 2 is a longitudinal sectional view showing the preform layered body 100. (B1) and (B2) of FIG. 2 are a side view and a longitudinal sectional view showing the inner-layer-use preform 110 of the preform layered body 100. (C1) and (C2) of FIG. 2 are a side view and a longitudinal sectional view showing the outer-layer-use preform 120 of the preform layered body 100.

The preform layered body 100 includes an inner-layer-use preform 110 that becomes the container inner layer body 10 of the layered container 1, an outer-layer-use preform 120 that becomes the container outer layer body 20 of the layered container 1, and an RFID tag 30. The inner-layer-use preform 110 and the outer-layer-use preform 120 are injection molded products of thermoplastic resin, and the inner-layer-use preform 110 as a whole is smaller than the outer-layer-use preform 120.

The inner-layer-use preform 110 includes an inner-layer-use bottom 112 and an inner-layer-use body 113 subjected to stretch-blow forming to form the bottom inner layer part 12 and the body inner layer part 13 of the container inner layer body 10 of the layered container 1, and an inner-layer-use mouth 114 that remains as the mouth inner layer part 14 of the container inner layer body 10 without being subjected to stretch-blow forming. The outer-layer-use preform 120 includes an outer-layer-use bottom 122 and an outer-layer-use body 123 subjected to stretch-blow forming to form the bottom outer layer part 22 and the body outer layer part 23 of the container outer layer body 20 of the layered container 1, and an outer-layer-use mouth 124 that remains as the mouth outer layer part 24 of the container outer layer body 20 without being subjected to stretch-blow forming. A male threaded part 105 and a support ring 106 are formed on the outer peripheral surface of the outer-layer-use mouth 124. These are parts that remain as they are as the male threaded part 5 and the support ring 6 of the layered container 1.

The inner-layer-use preform 110 is inserted from the open end of the outer-layer-use mouth 124 of the outer-layer-use preform 120, and the preform layered body 100 is obtained by coaxially overlapping them. The RFID tag 30 is disposed between the inner-layer-use mouth 114 of the inner-layer-use preform 110 and the outer-layer-use mouth 124 of the outer-layer-use preform 120. The part where the RFID tag 30 is disposed is a part that is not subjected to stretch-blow forming and remains as the mouth inner layer part 14 and the mouth outer layer part 24 that configure the container mouth 4 of the layered container 1 as it is.

Here, a tag housing gap 107 is formed between the outer peripheral surface of the inner-layer-use mouth 114 and the inner peripheral surface of the outer-layer-use mouth 124. In this example, a rectangular recess 117 having a depth and a size capable of housing the RFID tag 30 is formed in the outer peripheral surface of the inner-layer-use mouth 114. The tag housing gap 107 is formed between the recess 117 and the inner peripheral surface of the outer-layer-use mouth 124, and the RFID tag 30 is housed therein. The tag housing gap 107 is a part that remains as the tag housing gap 7 of the layered container 1 as it is. An RFID tag 230 is attached to the bottom surface of the recess 117 of the inner-layer-use mouth 114 of the inner-layer-use preform 110 with an adhesive or the like, and positioned within the recess 117. The RFID tag 30 may be attached to a part of the inner peripheral surface of the outer-layer-use mouth 124 of the outer-layer-use preform 120 corresponding to the recess 117 with an adhesive or the like.

An annular engagement flange 119 that spreads outward is formed at the upper opening edge of the inner-layer-use mouth 114 of the inner-layer-use preform 110. By abutting the engagement flange 119 against the mouth top surface of the outer-layer-use mouth 124 of the outer-layer-use preform 120, both preforms are positioned in the direction of the central axis. In addition, in order to prevent the inner-layer-use preform 110 from slipping out of the outer-layer-use mouth 124 of the outer-layer-use preform 120, a mechanical engaging part is formed between the outer-layer-use mouth 124 of the outer-layer-use preform 120 and the inner-layer-use mouth 114 of the inner-layer-use preform 110 to maintain the overlapping state. For example, in a part other than the tag housing gap 107 in which the RFID 30 is disposed, the dimensions of these parts are set so that the outer peripheral surface of the inner-layer-use mouth 114 is fitted and fixed in close contact with the inner peripheral surface of the outer-layer-use mouth 124. In addition, the outer diameter of the inner-layer-use body 113 of the inner-layer-use preform 110 is smaller than the inner diameter of the outer-layer-use body 123 of the outer-layer-use preform 120. In this way, a gap layer 130 having a predetermined width is formed in the preform layered body 100, between the inner-layer-use bottom 112 and the inner-layer-use body 113 of the inner-layer-use preform 110 and the outer-layer-use bottom 122 and the outer-layer-use body 123 of the outer-layer-use preform 120.

(Manufacturing Steps of the Layered Container)

Figure 3:
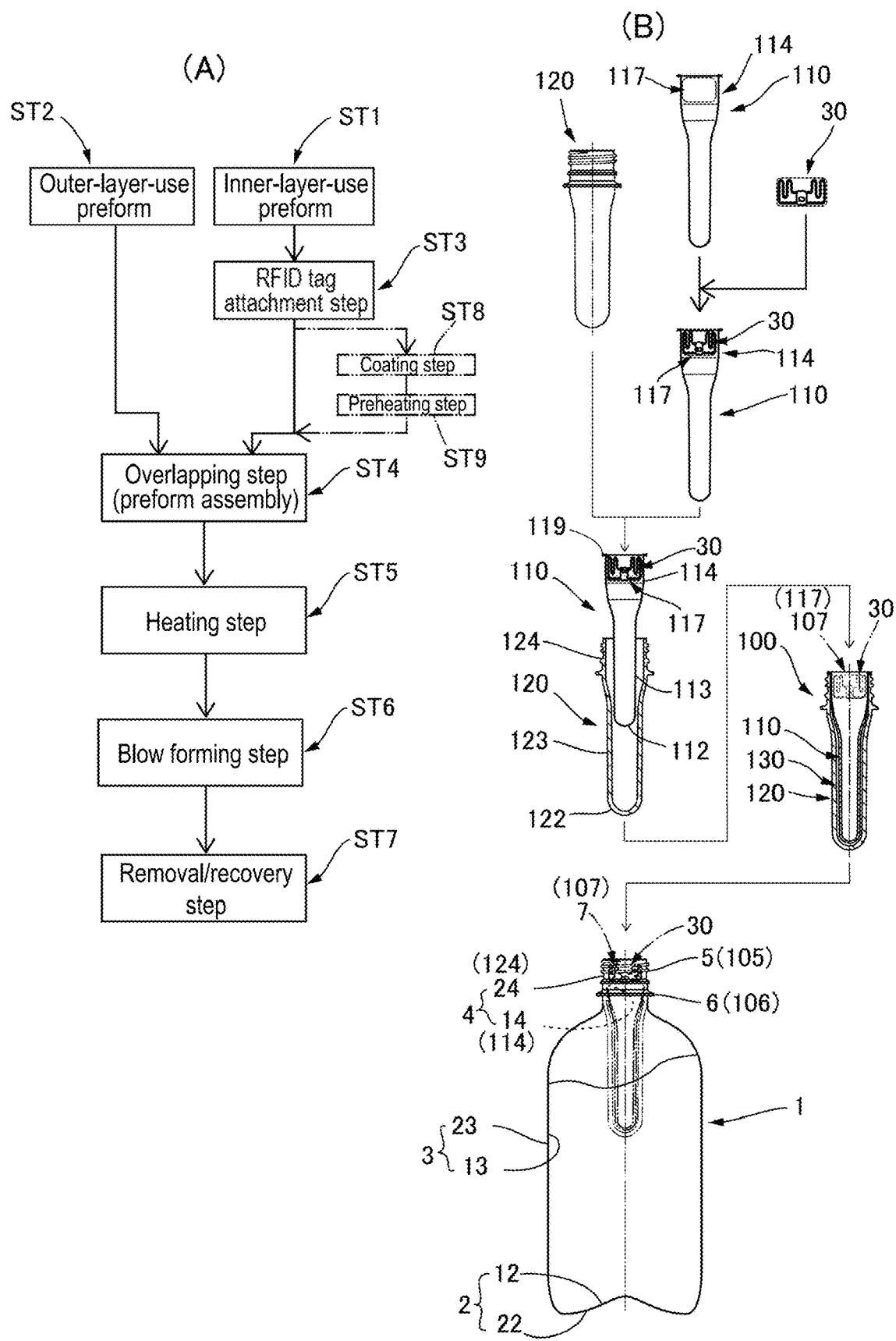
In FIG. 3, (A) is an illustration view showing the steps of stretch-blow forming a layered container using a preform layered body, and (B) is an illustration view showing the inner-layer-use preform, the outer-layer-use preform, the preform layered body and the layered container in each step.

In FIG. 3, (A) is an illustration view showing the steps of stretch-blow forming the layered container 1 using the preform layered body 100, and (B) is an illustration view showing the inner-layer-use preform 110, the outer-layer-use preform 120, the preform layered body 100 and the layered container 1 in each step.

First, the inner-layer-use preform 110 is manufactured from a thermoplastic resin material by injection molding (step ST1). Separately from this, the outer-layer-use preform 120 is manufactured from a thermoplastic resin material by injection molding (step ST2). On the outer peripheral surface of the inner-layer-use mouth 114 of the inner-layer-use preform 110, the RFID tag 30 is positioned and adhered to the bottom part of the recess 117 formed in the outer peripheral surface (step ST3: RFID tag attachment step).

The inner-layer-use preform 110 is inserted from the open end of the outer-layer-use mouth 124 of the outer-layer-use preform 120, positioned coaxially, and overlapped (step ST4: overlapping step). The preform layered body 100 is obtained by coaxially overlapping the inner-layer-use preform 110 and the outer-layer-use preform 120.

The inner-layer-use preform 110 inserted into the outer-layer-use preform 120 is positioned in the direction of the central axis by engaging the engagement flange 119 with the mouth top surface of the outer-layer-use mouth 124 of the outer-layer-use preform 120. In addition, by fitting the inner-layer-use mouth 114 into the outer-layer-use mouth 124, the inner-layer-use preform 110 is positioned coaxially with respect to the outer-layer-use preform 120, and the inner-layer-use preform 110 is prevented from slipping out of the outer-layer-use preform 120. Further, the gap layer 130 having a predetermined width is formed between the inner-layer-use body 113 and the inner-layer-use bottom 112 and the outer-layer-use body 123 and the outer-layer-use bottom 122.

Next, the preform layered body 100 is heated to a temperature suitable for stretch-blow forming, in this example, to a temperature suitable for biaxial stretch-blow forming (step ST5: heating step). For example, the preform layered body 100 is heated from the outside with a heater or the like. Heat is blocked by covering the mouth of the preform layered body 100 with a shielding plate or the like. The RFID tag 30 inserted in the mouth is not exposed to high temperature and damaged due to thermal deformation or the like.

The gap layer 130 having a predetermined width is formed in the preform layered body 100, between the inner-layer-use bottom 112 and the inner-layer-use body 113 of the inner-layer-use preform 110 and the outer-layer-use bottom 122 and the outer-layer-use body 123 of the outer-layer-use preform 120. In this way, in the heating step (step ST5), the outer peripheral surface of the inner-layer-use body 113 and the inner peripheral surface of the outer-layer-use body 123 are heated from the outside in a state where there is no contact part. Therefore, each part of the bodies 113 and 123 is uniformly heated, and a temperature condition suitable for blow forming is efficiently achieved.

The heated preform layered body 100 is placed in a blow forming mold (not shown), and the mold is closed, and biaxial stretch-blow forming is performed. In this way, the inner-layer-use preform 110 is formed on the container inner layer body 10 on the inside, and the outer-layer-use preform 120 is formed on the container outer layer body 20 on the outside (step ST6: blow forming step).

In this blow forming step, while the gap layer 130 of the preform layered body 100 is being crushed (while air is pushed out from the gap layer 130), the inner-layer-use bottom 112, the inner-layer-use body 113, the outer-layer-use bottom 122 and outer-layer-use body 123 are simultaneously biaxially stretch blown. The air in the gap layer 130 is discharged to the outside through, for example, a communicating passage (not shown) formed between the inner-layer-use mouth 114 and the outer-layer-use mouth 124. Further, although not shown, in the cavity of the blow forming mold in the closed state, the inner-layer-use preform 110 and the outer-layer-use preform 120 expand biaxially while being stretched by the blow air supplied inside the inner-layer-use preform 110 on the inside and the stretching rod inserted in the direction of the central axis. In this way, the inner-layer-use bottom 112 and the inner-layer-use body 113 of the inner-layer-use preform 110 and the outer-layer-use bottom 122 and the outer-layer-use body 123 of the outer-layer-use preform 120 are brought into close contact with each other and integrated.

In this way, the layered container 1 having a two-layer structure in which the container inner layer body 10 and the container outer layer body 20 are brought into close contact with each other is obtained. The layered container 1 is removed from the blow forming mold and recovered at a predetermined location (step ST7: removal/recovery step).

In the layered container 1, the container bottom 2 and the container body 3 are parts formed by biaxially stretch-blow forming the inner-layer-use preform 110 and the outer-layer-use preform 120. The container mouth 4 of the layered container 1 is a part where the inner-layer-use mouth 114 of the inner-layer-use preform 110 in which the RFID tag 30 is inserted and the outer-layer-use mouth 124 of the outer-layer-use preform 120 remain in an overlapping state. That is, the mouth of the preform layered body 100 is a part that is held by a part of a blow forming mold (not shown), and remains in the same shape without undergoing stretch-blow forming. Therefore, the RFID tag 30 disposed in the container mouth 4 is neither exposed to high-pressure air nor stretched. Therefore, in the blow forming step, the RFID tag 30 is not damaged or disconnected.

In order to increase the bonding strength between the container inner layer body 10 and the container outer layer body 20 in the layered container 1, an adhesive or a pressure-sensitive adhesive may be coated to part or all of the outer peripheral surface of the inner-layer-use preform 110. For example, as indicated by an imaginary line in FIG. 3, a coating step (step ST8) of coating a chemical such as an adhesive or a pressure-sensitive adhesive to the outer peripheral surface of the inner-layer-use preform 110 is performed before the overlapping step (step ST4).

Further, in the heating step (step ST5) of FIG. 3, when the preforms 110 and 120 are heated from the outside, it may be difficult to heat the inner-layer-use preform 110 on the inside to an appropriate temperature. In this case, as indicated by an imaginary line in FIG. 3, a preheating step (step ST9) for preheating the inner-layer-use preform 110 located on the inside may be performed prior to the overlapping step (step ST4).

Second Embodiment

A layered container, a preform layered body, and manufacturing steps of a layered container according to a second embodiment to which the disclosure is applied will be described below with reference to FIGS. 4 to 6.

(Layered Container)

Figure 4:
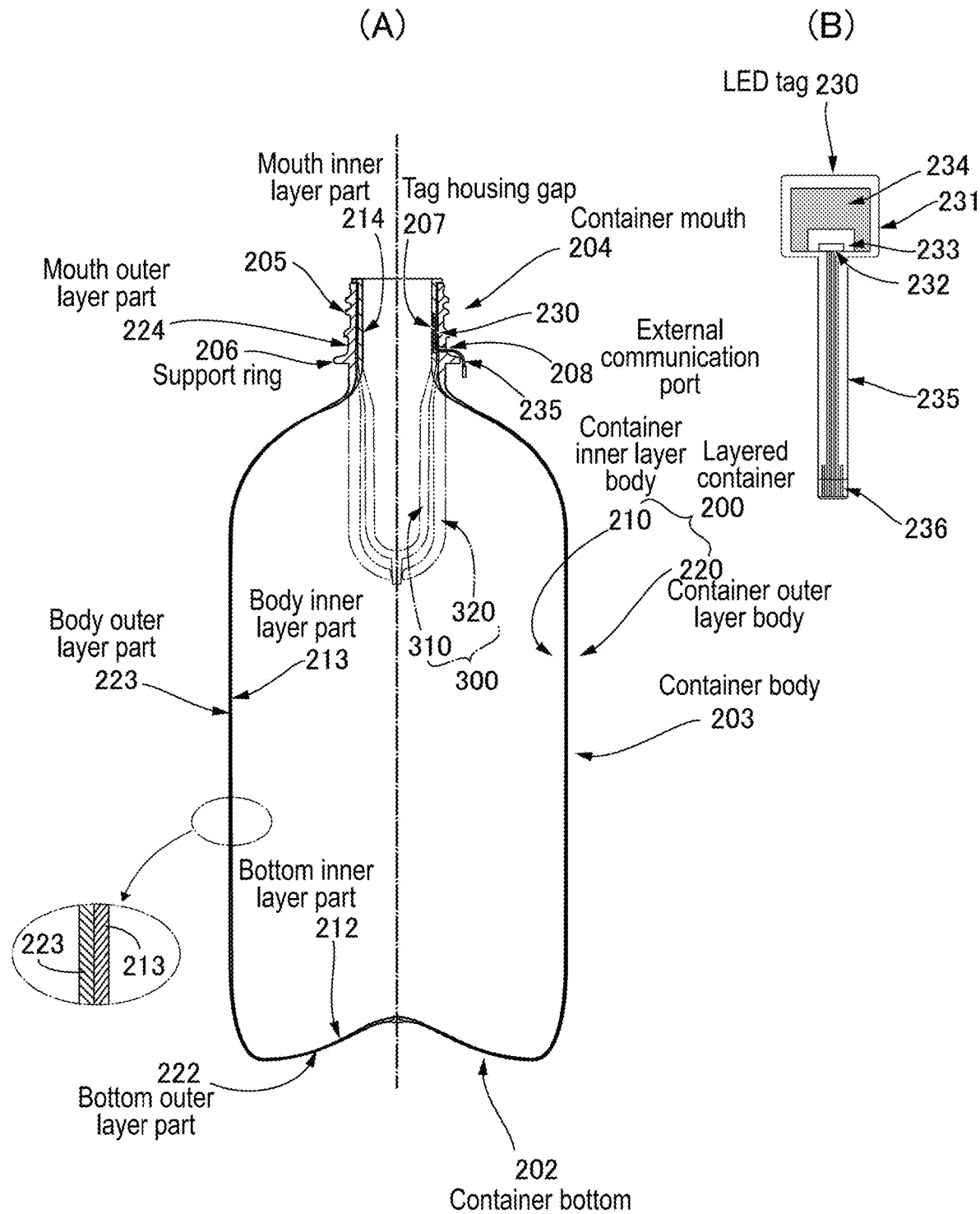
In FIG. 4, (A) is an illustration view showing a layered container according to a second embodiment of the disclosure, and (B) is an illustration view showing an LED tag.

(A) of FIG. 4 is an illustration view showing the layered container according to the second embodiment. The layered container 200 is a biaxially stretched blow-formed product made of a thermoplastic resin, and includes a container bottom 202, a cylindrical container body 203, and a thin cylindrical container mouth 204 formed at the upper end of the container body 203. A male threaded part 205 for attaching a cap (not shown) is formed on the outer peripheral surface of the container mouth 204, and an annular support ring 206 is formed between the male threaded part 205 and the upper neck part of the container body 203.

The layered container 200 has a two-layer structure in which a container inner layer body 210 is layered inside a container outer layer body 220. Of course, a layered structure of three or more layers may also be used, in which case the inner layer of the two layers adjacent in the container inner-outer direction corresponds to the container inner layer body, and the outer layer corresponds to the container outer layer body.

The container inner layer body 210 includes a bottom inner layer part 212 and a body inner layer part 213 subjected to stretch-blow forming to form the inner layer parts of the container bottom 202 and the container body 203, and a mouth inner layer part 214 which forms the inner layer part of the container mouth 204 without being subjected to stretch-blow forming. Similarly, the container outer layer body 220 includes a bottom outer layer part 222 and a body outer layer part 223 subjected to stretch-blow forming to form the outer layer parts of the container bottom 202 and the container body 203, and a mouth outer layer part 224 which forms the outer layer part of the container mouth 204 without being subjected to stretch-blow forming. The male threaded part 205 and the support ring 206 are integrally formed on the outer peripheral surface of the mouth outer layer part 224. In the layered container 200, a sheet-like LED tag 230 having a rectangular outline is inserted between the mouth inner layer part 214 and the mouth outer layer part 224 that configure the container mouth 204.

(B) of FIG. 4 is an illustration view showing an example of the LED tag. The LED tag 230 is a flexible printed circuit board with an LED and an electric circuit mounted on it, and includes an insulating base film 231 made of PET, polyimide, and the like, an LED 232 mounted on this surface, and a circuit part 233 made of a conductive material such as copper foil or conductive paste. In this example, a capacitance sensor 234 (touch sensor) for turning on/off the LED 232 is also mounted on the base film 231.

A long and narrow wiring board 235 on which wiring for power supply is printed extends from a part of the rectangular base film 231. A connector 236 is attached to the tip of the wiring board 235. The connector 236 may be connected to an adapter (not shown) capable of supplying DC current of a predetermined voltage. For example, the thickness of the base film 231 is about 125 μm, and the thickness of the circuit part 233 and the capacitance sensor 234 mounted on this surface is about 10 μm, and the thickness of the LED 232 is about 500 μm.

A tag housing gap 207 is formed between the outer peripheral surface of the mouth inner layer part 214 and the inner peripheral surface of the mouth outer layer part 224. A rectangular recess having a depth and a size capable of housing the LED tag 230 is formed in the outer peripheral surface of the mouth inner layer part 214 of the container inner layer body 210. The tag housing gap 207 is formed between the recess and the inner peripheral surface of the mouth outer layer part 224. The LED tag 230 is housed in the tag housing gap 207.

In addition, an external communication port 208 that communicates with the tag housing gap 207 is opened in the outer peripheral surface of the mouth outer layer part 224 of the container outer layer body 220. The external communication port 208 is opened at a position adjacent to the upper side of the support ring 206 in the mouth outer layer part 224. An elongated wiring board 235 for power supply extending from the LED tag 230 housed in the tag housing gap 207 is pulled out from the external communication port 208.

The layered container 200 having this configuration is provided in a state in which it is filled with a content such as a beverage and capped. The wiring board 235 for power supply to the LED tag 230 inserted in the container mouth 204 is pulled out from between the cap (not shown) and the support ring 206. A DC power supply is connected to the connector 236 at the tip of the wiring board 235, and when the part corresponding to the LED tag 230 on the outer peripheral surface of the container mouth 204 is touched from above the cap or with the cap removed, the LED 232 is turned on by the capacitance sensor 234 and lights in a predetermined emission color. For example, it may provide a decorative effect or the like to the layered container 200.

The layered container 200 having the above configuration is obtained by stretch-blow forming a preform layered body 300 having a configuration in which an outer-layer-use preform 320 and an inner-layer-use preform 310 of different sizes shown by imaginary lines in (A) of FIG. 4 are overlapped.

(Preform Layered Body)

Figure 5:
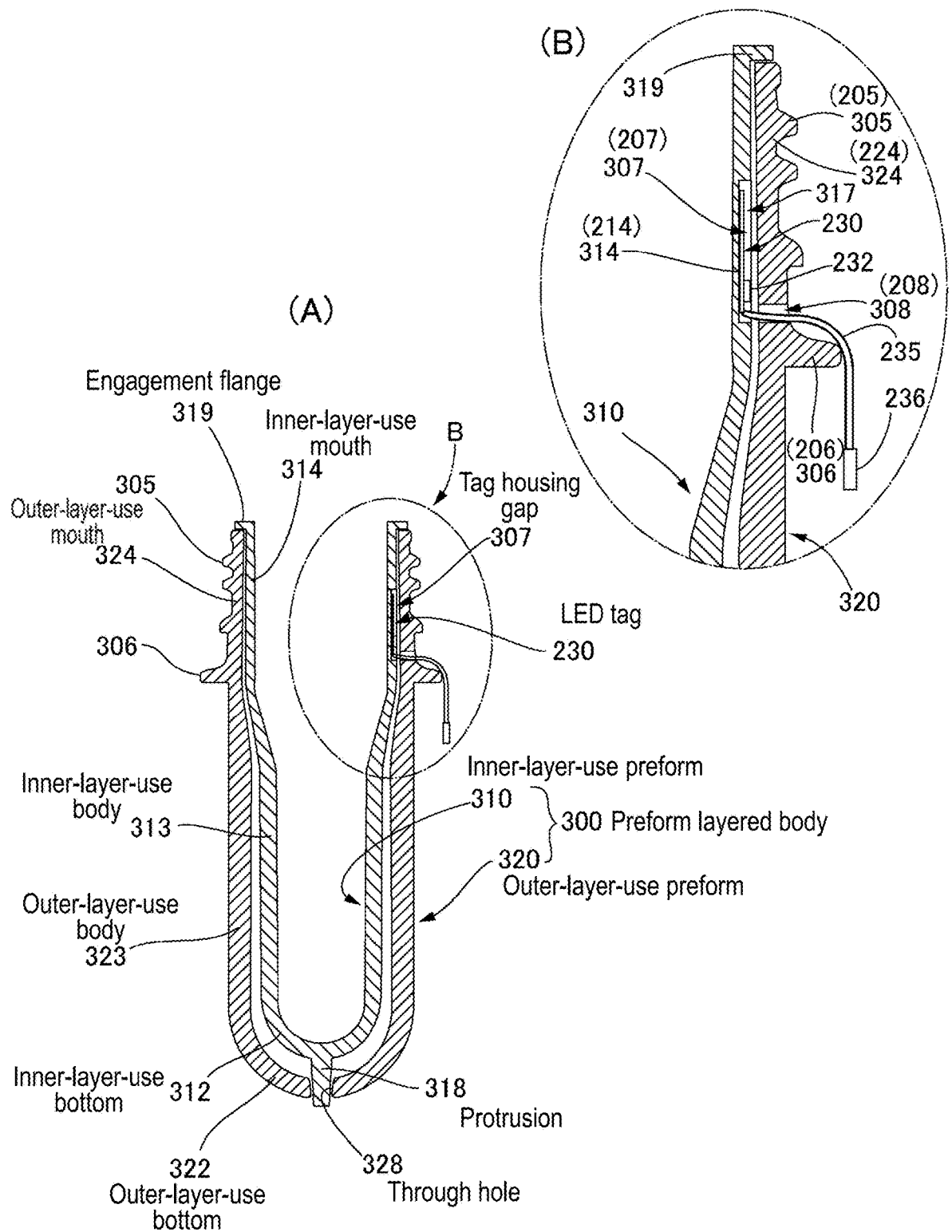
In FIG. 5, (A) is an illustration view showing an example of a preform layered body, and (B) is a partially enlarged cross-sectional view of the mouth thereof.

In FIG. 5, (A) is an illustration view showing a preform layered body, and (B) is a partially enlarged cross-sectional view of the mouth thereof. The preform layered body 300 of this example includes an inner-layer-use preform 310 that becomes the container inner layer body 210 of the layered container 200, an outer-layer-use preform 320 that becomes the container outer layer body 220 of the layered container 200, and an LED tag 230. The inner-layer-use preform 310 and the outer-layer-use preform 320 are injection molded products of thermoplastic resin, and the inner-layer-use preform 310 as a whole is smaller than the outer-layer-use preform 320.

The inner-layer-use preform 310 includes an inner-layer-use bottom 312 and an inner-layer-use body 313 subjected to stretch-blow forming to form the bottom inner layer part 212 and the body inner layer part 213 of the container inner layer body 210 of the layered container 200, and an inner-layer-use mouth 314 that remains as the mouth inner layer part 214 of the container inner layer body 210 without being subjected to stretch-blow forming. The outer-layer-use preform 320 includes an outer-layer-use bottom 322 and an outer-layer-use body 323 subjected to stretch-blow forming to form the bottom outer layer part 222 and the body outer layer part 223 of the container outer layer body 220 of the layered container 200, and an outer-layer-use mouth 324 that remains as the mouth outer layer part 224 of the container outer layer body 220 without being subjected to stretch-blow forming. A male threaded part 305 and a support ring 306 are formed on the outer peripheral surface of the outer-layer-use mouth 324. These are parts that remain as they are as the male threaded part 205 and the support ring 206 of the layered container 200.

The inner-layer-use preform 310 is inserted into the outer-layer-use preform 320, so that the inner-layer-use bottom 312 and the inner-layer-use body 313 are coaxially disposed inside the outer-layer-use bottom 322 and the outer-layer-use body 323, and the inner-layer-use mouth 314 is coaxially disposed inside the outer-layer-use mouth 324.

The LED tag 230 is disposed between the inner-layer-use mouth 314 of the inner-layer-use preform 310 and the outer-layer-use mouth 324 of the outer-layer-use preform 320. The part where the LED tag 230 is disposed is a part that is not subjected to stretch-blow forming and remains as the mouth inner layer part 214 and the mouth outer layer part 224 that configure the container mouth 204 of the layered container 200 as it is.

A tag housing gap 307 is formed between the outer peripheral surface of the inner-layer-use mouth 314 and the inner peripheral surface of the outer-layer-use mouth 324. In this example, a rectangular recess 317 having a depth and a size capable of housing the LED tag 230 is formed in the outer peripheral surface of the inner-layer-use mouth 314. The tag housing gap 307 is formed between the recess 317 and the inner peripheral surface of the outer-layer-use mouth 324, and the LED tag 230 is housed therein. In addition, an external communication port 308 that communicates with the tag housing gap 307 is opened in the outer peripheral surface of the outer-layer-use mouth 324 of the outer-layer-use preform 320. The external communication port 308 is opened at a position adjacent to the upper side of the support ring 306 in the outer-layer-use mouth 324. An elongated wiring board 235 for power supply extending from the LED tag 230 housed in the tag housing gap 307 is pulled out from the external communication port 308. The tag housing gap 307 and the external communication port 308 are parts that remain as the tag housing gap 207 and the external communication port 208 of the layered container 200 as they are.

Here, a positioning protrusion 318 extending in the direction of the central axis of the inner-layer-use preform 310 is formed at the center of the outer peripheral surface of the inner-layer-use bottom 312 of the inner-layer-use preform 310. The protrusion 318 is, for example, a trace of a gate left during injection molding of the inner-layer-use preform 310. A through hole 328 is formed in the center of the outer-layer-use bottom 322 of the outer-layer-use preform 320 to extend through the outer-layer-use bottom 322 in the direction of the central axis of the outer-layer-use preform 320. The positioning protrusion 318 is inserted into the through hole 328 to position the inner-layer-use preform 310 and the outer-layer-use preform 320 coaxially. Further, an annular engagement flange 319 that spreads outward is formed at the upper opening edge of the inner-layer-use mouth 314 of the inner-layer-use preform 310. By abutting the engagement flange 319 against the upper edge of the outer-layer-use mouth 324 of the outer-layer-use preform 320, both preforms 310 and 320 are positioned in the direction of the central axis.

In addition, in order to prevent the inner-layer-use preform 310 from slipping out of the outer-layer-use mouth 324 of the outer-layer-use preform 320, a mechanical engaging part is formed between the outer-layer-use mouth 324 of the outer-layer-use preform 320 and the inner-layer-use mouth 314 of the inner-layer-use preform 310 to maintain the overlapping state. For example, in a part other than the tag housing gap 307, the dimensions of these parts are set so that the outer peripheral surface of the inner-layer-use mouth 314 is fitted and fixed in close contact with the inner peripheral surface of the outer-layer-use mouth 324.

(Manufacturing Step of the Layered Container)

Figure 6:
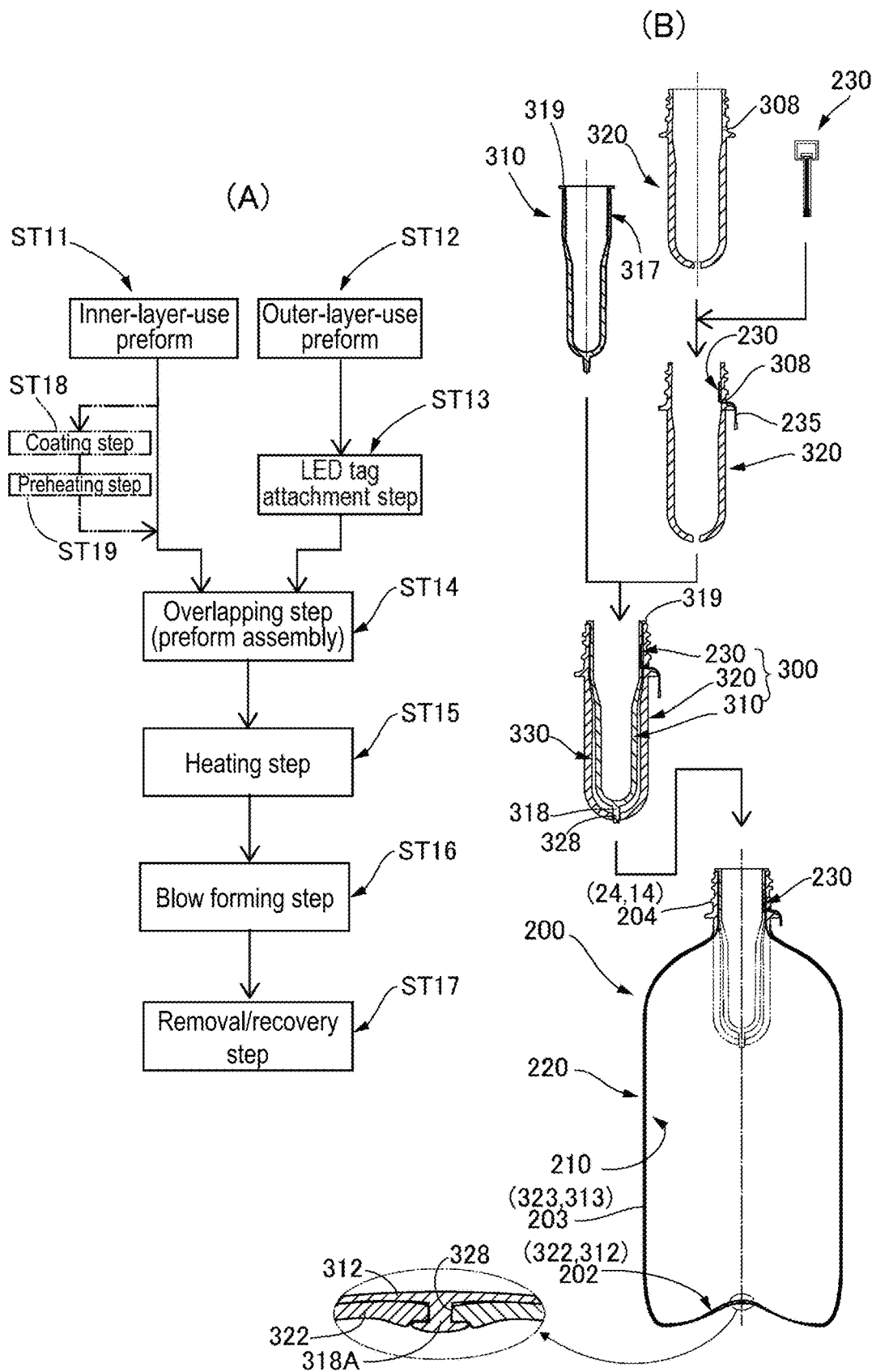
In FIG. 6, (A) is an illustration view showing the steps of stretch-blow forming a layered container using a preform layered body, and (B) is an illustration view showing the inner layer-use preform, the outer layer-use preform, the preform layered body and the layered container in each step.

(A) of FIG. 6 is an illustration view showing the steps of stretch-blow forming the layered container 200 using the preform layered body 300. (B) of is an illustration view showing the inner layer-use preform 310, the outer layer-use preform 320, the preform layered body 300 and the layered container 200 in each step.

The inner-layer-use preform 310 is manufactured from a thermoplastic resin material by injection molding (step ST11). Separately from this, the outer-layer-use preform 320 is manufactured from a thermoplastic resin material by injection molding (step ST12). On the inner peripheral surface of the outer-layer-use mouth 324 of the outer-layer-use preform 320, the LED tag 230 is attached to the inner peripheral surface part corresponding to the recess 317 of the inner-layer-use mouth 314, and the wiring board 235 for power supply drawn out from there is pulled out from the external communication port 308 to the outside (step ST13: LED tag attachment step).

The inner-layer-use preform 310 is inserted from the open end of the outer-layer-use mouth 324 of the outer-layer-use preform 320, positioned coaxially, and overlapped (step ST14: overlapping step). The preform layered body 300 is obtained by coaxially overlapping the inner-layer-use preform 310 and the outer-layer-use preform 320.

The inner-layer-use preform 310 inserted into the outer-layer-use preform 320 is positioned in the direction of the central axis by engaging the engagement flange 319 with the mouth top surface of the outer-layer-use mouth 324 of the outer-layer-use preform 320. Further, in this state, the protrusion 318 of the inner-layer-use preform 310 is inserted into the through hole 328 of the outer-layer-use preform 320 and protrude to the outside of the outer-layer-use preform 320. By inserting the protrusion 318 into the through hole 328, the inner-layer-use preform 310 is positioned coaxially with respect to the outer-layer-use preform 320.

In addition, the outer diameter of the inner-layer-use body 313 of the inner-layer-use preform 310 is smaller than the inner diameter of the outer-layer-use body 123 of the outer-layer-use preform 320. Therefore, a gap layer 330 having a predetermined width is formed between the inner-layer-use body 313 and the outer-layer-use body 323.

Next, the preform layered body 300 is heated to a temperature suitable for stretch-blow forming, in this example, to a temperature suitable for biaxial stretch-blow forming (step ST15: heating step). For example, the preform layered body 300 is heated from the outside with a heater or the like. Heat is blocked by covering the mouth of the preform layered body 300 with a shielding plate or the like. The LED tag 230 inserted in the mouth is not exposed to high temperature and damaged due to thermal deformation or the like.

The gap layer 330 having a predetermined width is formed in the preform layered body 300, between the inner-layer-use bottom 312 and the inner-layer-use body 313 of the inner-layer-use preform 310 and the outer-layer-use bottom 322 and the outer-layer-use body 323 of the outer-layer-use preform 320. In this way, in the heating step (step ST15), the outer peripheral surface of the inner-layer-use body 313 and the inner peripheral surface of the outer-layer-use body 323 are heated from the outside in a state where there is no contact part. Therefore, each part of the bodies 313 and 323 is uniformly heated, and a temperature condition suitable for blow forming is efficiently achieved.

The heated preform layered body 300 is placed in a blow forming mold (not shown), and the mold is closed, and biaxial stretch-blow forming is performed. In this way, the inner-layer-use preform 310 is formed on the inner container inner layer body 210, and the outer-layer-use preform 320 is formed on the outer container outer layer body 220 (step ST16: blow forming step).

In the blow forming step, while the gap layer 330 of the preform layered body 300 is being crushed (while air is pushed out from the gap layer 330), the outer-layer-use bottom 312, the outer-layer-use body 313, the outer-layer-use bottom 322 and outer-layer-use body 323 are simultaneously biaxially stretch blown. The air in the gap layer 330 is rapidly discharged to the outside through the tag housing gap 307 and the external communication port 308. Further, the air in the gap layer 330 is discharged to the outside through the through hole 328 of the outer-layer-use bottom 322. Although not shown, in the cavity of the blow forming mold in the closed state, the inner-layer-use preform 310 and the outer-layer-use preform 320 expand biaxially while being stretched by the blow air supplied inside the inner-layer-use preform 310 on the inside and the stretching rod inserted in the direction of the central axis. In this way, the inner-layer-use bottom 312 and the inner-layer-use body 313 of the inner-layer-use preform 310 and the outer-layer-use bottom 322 and the outer-layer-use body 323 of the outer-layer-use preform 320 are brought into close contact with each other and integrated.

In the blow forming step, the protrusion 318 of the inner-layer-use bottom 312 of the inner-layer-use preform 310 are pressed against the bottom mold (not shown) side of the blow forming mold by the stretching rod and crushed. In this way, in the container bottom 202 of the stretch-blow formed two-layer layered container 200, the bottom inner layer part 212 and the bottom outer layer part 222 are sandwiched and fixed from above and below (both sides) by the crushed protruding part 318A. In this way, the bonding strength between the container inner layer body 210 and the container outer layer body 220 at the bottom is increased.

In this way, the layered container 200 having a two-layer structure in which the container inner layer body 210 and the container outer layer body 220 are brought into close contact with each other is obtained. The layered container 200 is removed from the blow forming mold and recovered at a predetermined location (step ST17: removal/recovery step).

In the layered container 200, the container bottom 202 and the container body 203 are parts formed by biaxially stretch-blow forming the inner-layer-use preform 310 and the outer-layer-use preform 320. The container mouth 204 of the layered container 200 is a part where the inner-layer-use mouth 314 of the inner-layer-use preform 310 in which the LED tag 230 is inserted and the outer-layer-use mouth 324 of the outer-layer-use preform 320 remain in an overlapping state. That is, the mouth of the preform layered body 300 is a part that is held by a part of a blow forming mold (not shown), and remains in the same shape without undergoing stretch-blow forming. The LED tag 230 disposed in the container mouth 204 is neither exposed to high-pressure air nor stretched. Therefore, in the stretch-blow forming step, the LED tag 230 is not damaged or disconnected.

In order to increase the bonding strength between the container inner layer body 210 and the container outer layer body 220 in the layered container 200, an adhesive or a pressure-sensitive adhesive may be coated to part or all of the outer peripheral surface of the inner-layer-use preform 310. For example, as indicated by an imaginary line in FIG. 6, a coating step (step ST18) of coating a chemical such as an adhesive or a pressure-sensitive adhesive to the outer peripheral surface of the inner-layer-use preform 310 is performed before the overlapping step (step ST14).

Further, in the heating step (step ST15) of FIG. 6, when the preforms 310 and 320 are heated from the outside, it may be difficult to heat the inner-layer-use preform 310 on the inside to an appropriate temperature. In this case, as indicated by an imaginary line in FIG. 6, a preheating step (step ST19) for preheating the inner-layer-use preform 310 located on the inside may be performed prior to the overlapping step (step ST14).

(Another Example of the Layered Container)

Figure 7:
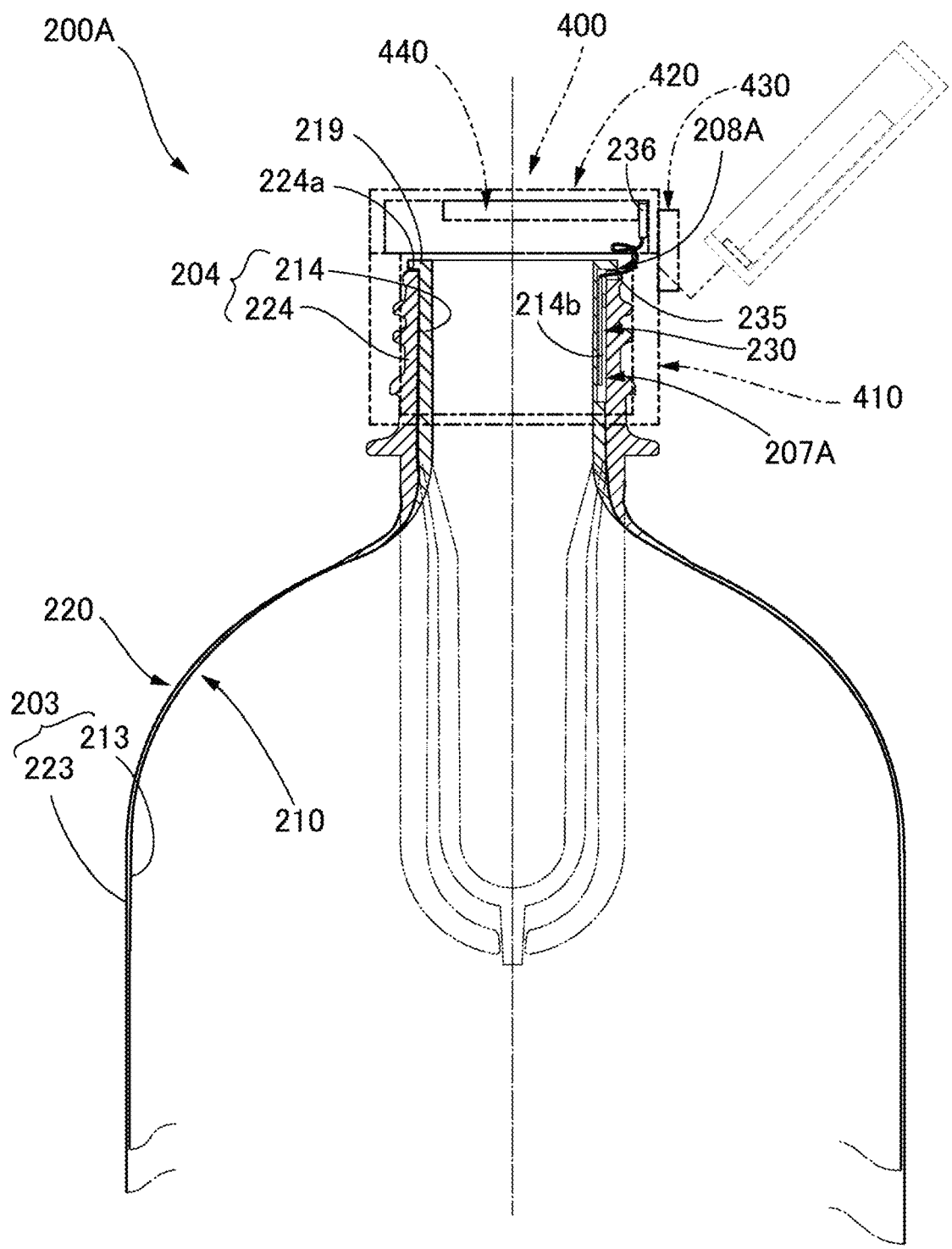
FIG. 7 is an illustration view showing another example of the layered container according to the second embodiment.

FIG. 7 is an illustration view showing another example of the layered container. Since the overall configuration of the layered container 200A shown in FIG. 7 is the same as that of the layered container 200 described above, the corresponding parts are denoted by the same reference numerals, and the description thereof is omitted. In the layered container 200A of this example as well, a tag housing gap 207A is formed between the outer peripheral surface of the mouth inner layer part 214 and the inner peripheral surface of the mouth outer layer part 224. A rectangular recess 214b having a depth and a size capable of housing the LED tag 230 is formed in the outer peripheral surface of the mouth inner layer part 214 of the container inner layer body 210. The tag housing gap 207A is formed between the recess 214b and the outer peripheral surface of the mouth outer layer part 224, and the LED tag 230 is stored therein.

In addition, a top surface recess having a constant width and a constant depth is formed in a part of the mouth top surface 224a of the mouth outer layer part 224 that faces the recess 214b. The lower surface of the annular flange 219 that defines the mouth top surface of the mouth inner layer part 214 is in contact with the mouth top surface 224a of the mouth outer layer part 224 from above. An external communication port 208A is formed between the top surface recess and the lower surface of the flange 219 to communicate the tag housing gap 207A with the outside. The wiring board 235 pulled out from the LED tag 230 stored in the tag housing gap 207A is pulled out to the outside through the external communication port 208A.

For example, a hinged cap is known as a cap that covers the container mouth 204. As schematically shown by imaginary lines in FIG. 7, the hinged cap 400 includes a cap cylindrical part 410 having a female threaded part formed on its inner peripheral surface to be screwed into the container mouth 204, and a cap lid part 420 that opens and closes the upper end opening of the cap cylindrical part 410, and the cap lid part 420 is connected to the cap cylindrical part 410 via a hinge part 430. At the upper end of the cap cylindrical part 410, a small-diameter spout for contents is opened at the center part and is closed by the cap lid part 420. For example, a power supply such as a button battery 440 may be embedded in the cap lid part 420, and the wiring board 235 may be connected via the connector 236 to it. In this way, the LED tag 230 may be lit without requiring an external power supply. A battery power supply may also be embedded in the cap cylindrical part 410 side.

What is claimed is:

1. A preform layered body for forming a layered container comprising a cylindrical container body, a container bottom closing a lower end of the container body, and a container mouth formed at an upper end of the container body by biaxial stretch-blow forming, the preform layered body comprising:

an inner-layer-use preform for forming an inner layer of the layered container;

an outer-layer-use preform for forming an outer layer of the layered container; and a tag, wherein the inner-layer-use preform is disposed inside the outer-layer-use preform, the inner-layer-use preform includes an inner-layer-use bottom and an inner-layer-use body subjected to biaxial stretch-blow forming to form a bottom inner layer part and a body inner layer part of the layered container, and an inner-layer-use mouth that remains as a mouth inner layer part of the layered container without being subjected to biaxial stretch-blow forming, the outer-layer-use preform includes an outer-layer-use bottom and an outer-layer-use body subjected to biaxial stretch-blow forming to form a bottom outer layer part and a body outer layer part of the layered container, and an outer-layer-use mouth that remains as a mouth outer layer part of the layered container without being subjected to stretch-blow forming, and the tag is disposed between the outer-layer-use mouth and the inner-layer-use mouth.

2. The preform layered body according to claim 1, wherein a housing gap is formed between an outer peripheral surface of the inner-layer-use mouth of the inner-layer-use preform and an inner peripheral surface of the outer-layer-use mouth of the outer-layer-use preform, and the tag is housed in the housing gap.

3. The preform layered body according to claim 2, wherein an external communication port that communicates with the housing gap is opened in an outer peripheral surface of the outer-layer-use mouth of the outer-layer-use preform.

4. The preform layered body according to claim 3, wherein a male threaded part and an annular support ring located between the male threaded part and the outer-layeruse body are formed on the outer peripheral surface of the outer-layer-use mouth of the outer-layer-use preform, and the external communication port is opened at a position adjacent to the support ring on the male threaded part side.

5. The preform layered body according to claim 1, wherein the tag is an RFID tag or an IC tag.

6. The preform layered body according to claim 3, wherein the tag is an LED tag comprising a flexible printed circuit board on which an LED is mounted, the LED tag comprises a wiring board for power supply to the LED, and the wiring board is drawn out from the external communication port.

7. The preform layered body according to claim 1, wherein a protrusion extending in a direction of a central axis of the inner-layer-use preform is formed on an outer peripheral surface of the inner-layer-use bottom of the inner-layer-use preform, a through hole is formed in a center of the outer-layer-use bottom of the outer-layer-use preform to extend through the outer-layer-use bottom in a direction of a central axis of the outer-layer-use preform, and the protrusion is inserted into the through hole to position the inner-layer-use preform and the outer-layer-use preform coaxially.

8. A layered container that is a biaxially stretched blow-formed product in which a tag is disposed between a container inner layer body and a container outer layer body that are layered, the layered container comprising:

a cylindrical container body;

a container bottom closing a lower end of the container body; and a container mouth formed at an upper end of the container body, wherein the container inner layer body comprises a bottom inner layer part and a body inner layer part subjected to biaxial stretch-blow forming to form inner layer parts of the container bottom and the container body, and a mouth inner layer part which forms an inner layer part of the container mouth without being subjected to biaxial stretch-blow forming, the container outer layer body comprises a bottom outer layer part and a body outer layer part subjected to biaxial stretch-blow forming to form outer layer parts of the container bottom and the container body, and a mouth outer layer part which forms an outer layer part of the container mouth without being subjected to biaxial stretch-blow forming, and the tag is disposed between the mouth inner layer part and the mouth outer layer part.

9. The layered container according to claim 8, wherein a housing gap is formed between an outer peripheral surface of the mouth inner layer part and an inner peripheral surface of the mouth outer layer part, and the tag is housed in the housing gap.

10. The layered container according to claim 9, wherein an external communication port that communicates with the housing gap is opened in the outer peripheral surface of the mouth outer layer part.

11. The layered container according to claim 10, wherein a male threaded part and an annular support ring located between the male threaded part and the body outer layer part are formed on the outer peripheral surface of the mouth outer layer part, and the external communication port is opened at a position adjacent to the support ring on the male threaded part side.

12. The layered container according to claim 8, wherein the tag is an RFID tag or an IC tag.

13. The layered container according to claim 10, wherein the tag is an LED tag comprising a flexible printed circuit board on which an LED is mounted, the LED tag comprises a wiring board for power supply to the LED, and the wiring board is drawn out from the external communication port.

* * * * *